Patented Oct. 9, 1945

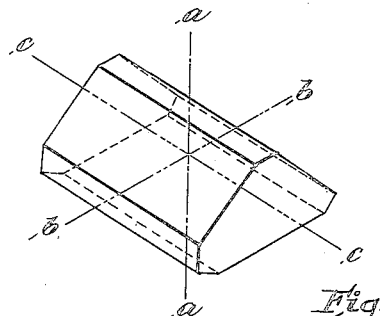
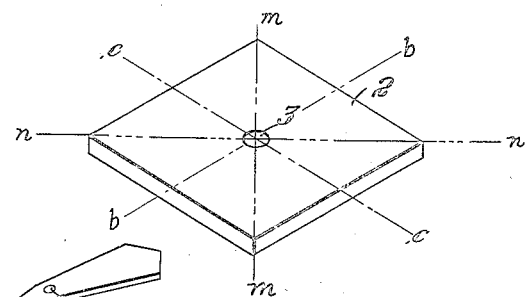
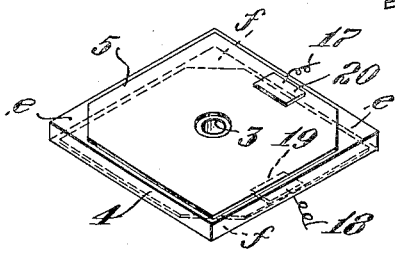
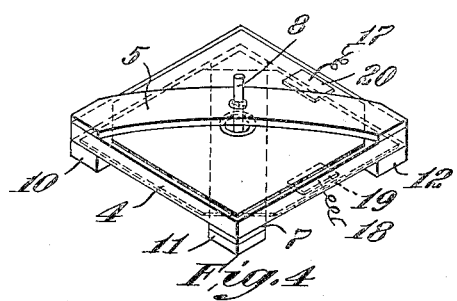
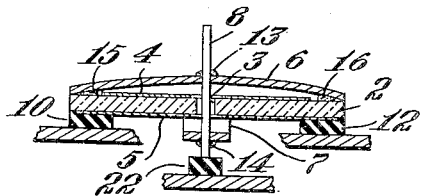
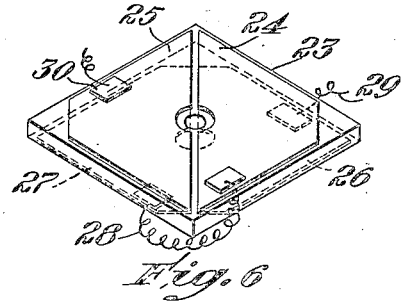
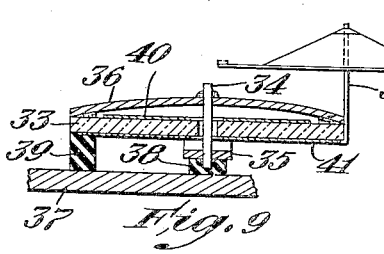
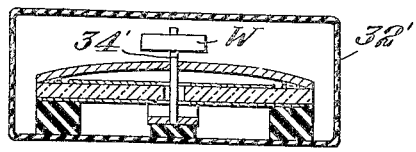

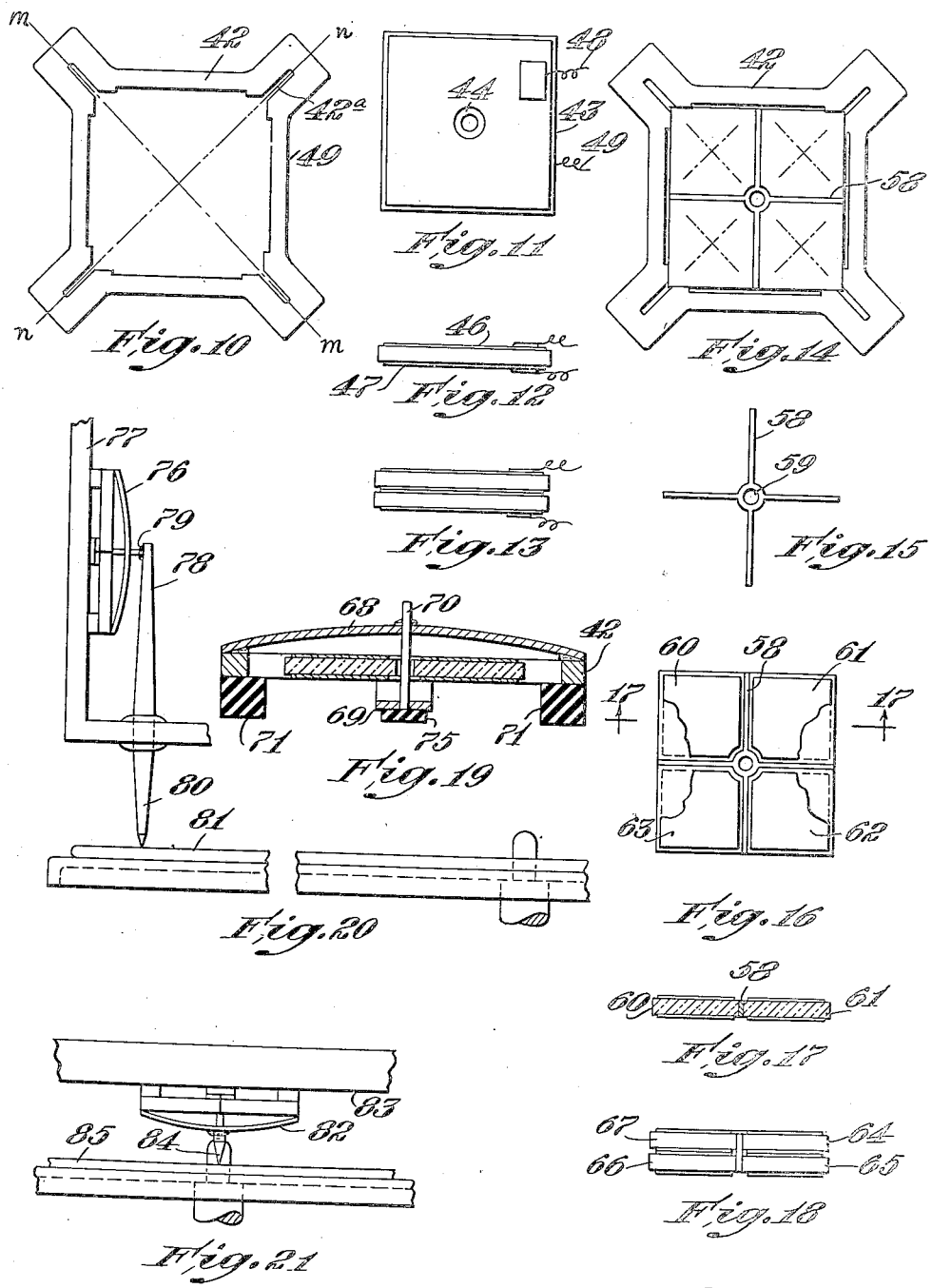

2,386,279

UNITED STATES PATENT OFFICE 2,386,279

PIEZOELECTRIC DEVICE

Raymond W. Tibbetts, Camden, Maine

Application July 21, 1942, Serial No. 451,690

18 Claims. (Cl. 171—327)

This invention relates to piezo-electric devices for converting electrical energy into mechanical vibrations or converting mechanical energy into electrical impulses.

Objects of the invention are to provide a piezo-electric device which will convert acoustical vibrations into electrical impulses without substantial distortion, which may have any desired electrical impedance, which may be readily cut from homogenous crystalline material, which is substantially unaffected in its operating characteristics by temperature variation, which magnifies the piezo-electric effect, which has increased sensitivity, which has a high order of natural frequency, which is substantially free from extraneous noises and which is generally superior to piezo-electric devices of the prior art.

In one aspect the present invention involves the combination of a piezo-electric slab which expands in one direction and contracts in another direction when subjected to electrostatic forces, together with a toggle extending in one of the aforesaid directions along one side of the slab, means connecting the ends of the toggle with the slab so that expansion of the slab in the direction of the toggle tends to straighten the toggle, and an actuator connected to the toggle intermediate its ends. While the perimeter of the slab may have any desired shape, it is preferably square with its two diagonals extending in the aforesaid directions respectively. The toggle may comprise an integral piece of flexible material bowed from end to end or bent in the middle, or it may comprise two relatively stiff members pivotally interconnected at the middle of the toggle. The actuator may be connected to a cutting or reproducing stylus or a sound producer or other device, depending upon the use, and in some cases the actuator may be connected merely to an inertia element.

In a more specific aspect of the invention a toggle is provided on each side of the device, one toggle extending in one of the aforesaid directions along one side of the slab and the other toggle extending in the other of said directions along the opposite side of the slab. Thus when the slab expands in one direction and contracts in the other direction, the middle of one toggle moves away from the slab and the middle of the other toggle moves towards the slab. Thus by connecting the actuator to the middle of each slab, the two toggles work together in moving the actuator back and forth. While the actuator may interconnect the two toggles around the edge of the device, it preferably comprises a pin extending freely through an opening in the device.

While the ends of the toggles may be cemented or otherwise secured to the sides of the slab, the device preferably comprises means fast to the ends of each toggle and bearing on opposite edges of the slab. Preferably the latter means comprises a frame extending around the perimeter of the slab, the frame being flexible to accommodate the piezo-electric distortion of the slab. The flexibility of the frame may be secured either by forming the frame of flexible material or, in the case of a square or other rectangular frame, by pivotally interconnecting the sides of the frame at the corners. When using a frame a plurality of rectangular piezo-electric slabs may be fitted into the same frame, either in superposed relationship or in the same plane or both. When a frame includes a plurality of slabs in the same plane, the slabs are preferably separated from each other by spacers.

For the purpose of illustration typical embodiments are shown in the accompanying drawings, in which Fig. 1 is a perspective view of a crystal from which one or more piezo-electric slabs may be cut;

Fig. 2 is a perspective view of a slab cut from the crystal;

Fig. 3 is a similar view with electrodes and leads mounted on the slab;

Fig. 4 is a perspective view of a complete unit;

Fig. 5 is a diagonal section through a unit such as shown in Fig. 4, illustrating one way of mounting the unit;

Fig. 6 is a perspective view like Fig. 4 except in that each electrode is divided into two parts;

Fig. 7 is a diagonal section similar to Fig. 5 showing a modification;

Fig. 8 is a perspective view of a modified toggle;

Fig. 9 is a section like Figs. 5 and 7 showing a modification;

Fig. 10 is a plan view of a frame;

Fig. 11 is a plan view of a unit adapted to fit in the aforesaid frame;

Fig. 12 is an edge view of the unit;

Fig. 13 is an edge view of a unit comprising two piezo-electric slabs;

Fig. 14 is a plan view of a frame with four piezo-electric slabs mounted therein in the same plane;

Fig. 15 is a plan view of the separator shown in Fig. 14;

Fig. 16 is a plan view of the piezo-electric assembly shown in Fig. 14, with the electrodes mounted thereon;

Fig. 17 is an edge view of the assembly shown in Fig. 16;

Fig. 18 is an edge view of a similar assembly comprising two layers of slabs;

Fig. 19 is a diagonal section of an assembly formed of the parts shown in Figs. 10, 11 and 12;

Fig. 20 is an elevation of one of the piezo-electric units mounted in a device for cutting a record of the lateral-movement type or for reproducing such a record;

Fig. 21 is a similar view of a device for use with records of the vertical-movement type.

Fig. 22 is a section showing protective coatings applied to a crystalline unit.

While any piezo-electric material may be used in the present invention, Rochelle salt crystals are preferred, such a crystal being shown in Fig. 1 in which $a$—$a$ is the electrical axis, $b$—$b$ the transverse axis and $c$—$c$ the longitudinal axis. In cutting a square slab from such a crystal for use according to the present invention, the crystal is so cut that the diagonal lines $m$—$m$ and $n$—$n$ bisect the angles between the axes $b$—$b$ and $c$—$c$. Thus when the slab expands along the line $m$—$m$, it contracts along the line $n$—$n$ and vice versa.

The crystalline slab for my piezo-electric unit may be of any desired shape. However I prefer a plate having substantially uniform major dimensions, that is a square plate, and having a thickness suitable to meet the mechanical and electrical specifications for which the unit is to be adapted. I have found for one application of my invention that a crystalline slab having major dimensions of 17 millimeters by 17 millimeters and having a thickness of .016 inch, meets both the mechanical and electrical requirements. A slab having these specifications is very suitable for a microphone in association with a suitable diaphragm, or for an ear phone as the unit has a sufficiently low capacitive impedance at low audio frequencies to faithfully produce or reproduce them.

The slab or plate of Rochelle salt crystal as indicated in Fig. 3 has a hole 3 cut or otherwise produced through the central portion made by the intersection of the lines $m$—$m$ and $n$—$n$. The axis of this hole is parallel with the electrical axis of the plate and is of sufficient diameter to allow a free clearance for the connecting pin 8, as shown in Fig. 4. The electrodes 4 and 5 are attached to the major surfaces of the crystalline plate by any suitable method. However I prefer to apply gold leaf electrodes in the manner shown and described in my Patent No. 2,287,950. It is desirable but not necessary to remove a portion of the electrode at opposite corners of the crystal, as shown at $e$—$e$ and $f$—$f$, in order that the cement substance used to secure the bow members 6 and 7 (Figs. 4 and 5) may have a better adhesion to the crystalline surface. Removal of the electrode at the above points will also prevent piezo-electric action of the crystal at these points. The lead extensions 17 and 18 (Fig. 3) may be of any suitable material and attached in any suitable manner. I prefer however to use a thin strip of pure silver foil or sheet and to secure the leads in electrical contact with the electrodes 4 and 5 by laying the lead end on the electrode and applying a small piece of tin foil or other metallic foil by the use of an adhesive such as asphaltum or Duco cement.

In Fig. 6 I show one of my crystalline plates on which a multiplicity of electrodes are assembled. In this specific case there are two electrodes on each major surface of the crystalline plate. These electrodes are connected in such a way that the electromotive forces are additive; thus, when used in conjunction with a device to convert mechanical motion or vibrations into electrical energy, substantially twice the voltage output may be obtained with a given mechanical force.

The bow elements are constructed and assembled in the manner as shown in Figs. 4 and 5 or Fig. 7. The bow elements may be made of any suitable material of a somewhat flexible nature, such as Bakelite, metal or other material, or they may be made from a section of the same crystalline material as that of the crystalline plate 2. I prefer however using a flat strip of Bakelite since this material can be readily fabricated and formed and has a low specific gravity, thus eliminating as much as possible inertia effects of the bows while vibrating in a plane parallel with the electrical axis of the crystalline plate 2. The degrees of arc of the bows is determined by several factors, among which is the use to which the piezo-electric unit is adapted. In practice I find, when the unit is to be used to convert electrical impulses into mechanical motion or vibrations, about one millimeter clearance of the highest point of the arc of the bow, which is at its substantial central portion from the surface of the crystalline plate is very satisfactory. When used as a microphone unit and being driven by a suitable diaphragm or associated with a phonograph stylus the clearance between the bow at its highest point may be somewhat less than one millimeter.

The bow elements 6 and 7 are cemented by any suitable manner firmly to the crystalline plate at the points $e$—$e$ and $f$—$f$ (Fig. 3) and as shown by the cemented portions 15 and 16 (Fig. 5). The bow members 6 and 7 are fixed on opposite sides of the crystalline portion 2 and are oriented at 90 degrees to each other, with the surface of the crystal cutting a chord with the arc of the bows. At the approximate center of each bow member a hole 21 is provided, this hole being just large enough to accommodate the pin member 8 of Figs. 4 and 5. After the bow elements have been cemented in place, the pin 8 is passed through the holes 21 of the bow elements and is cemented by any suitable cement, such as for example Duco cement, to the bow members at 13 and 14 of Fig. 5. The hole 3 in the crystalline plate (Fig. 3) provides an ample clearance with the pin 8 (Fig. 5). The pin 8 may be made of any suitable material having a low specific gravity. I find hard drawn aluminum to be a suitable material for this purpose. Since the pin 8 vibrates or moves in a direction parallel to its long axis, connection is made by the pin member to the acoustical diaphragm or other moving member or member to be actuated.

The supporting members 9—10—11 and 12 of Fig. 4 may be made of any suitable material having elastic properties, such as for example, rubber, viscose etc. These are cemented or otherwise secured to the surface of the crystalline portion at two opposite corners and to the surface of the two ends of the bow member 7, as in Fig. 4. The bow members may be made longer than the diagonal of the crystalline plate, thus causing an extension of the bow members beyond the apices of the crystal portion. In this case the supporting members 9—10—11 and 12 are cemented near the end portions of the bow members.

For some applications of my invention, it may be desirable to arrange the various elements as shown in Fig. 9. The arrangement of the bow or toggle members is the same as shown in Figs. 4 and 5, except in that the pin 34 of Fig. 9 needs only to extend through the holes of the bow or toggle members sufficiently to secure them properly to the pin. The flexible supporting pads 38 and 39, usually two in number, are disposed one near the end of the bow or toggle member 36 and the other at a point about midway of the member. These pads are cemented to a suitable base 37. To the opposite end of the bow or toggle member 36 a pin or other suitable driving connection 32 is attached. This in turn may be connected to an acoustical diaphragm 31 or other device, to drive the piezo-electric unit or to be driven by it.

In Fig. 11 I show a plate of piezo-electric crystalline material 43 such as Rochelle salt, together with its electrodes and leads 48 and 49 and having a hole 44 pierced centrally with the plate through which a connecting pin may pass freely. The frame shaped member 42 of Fig. 10 may take the shape as shown having suitable slots at the apices. This frame member may be made of any suitable somewhat flexible material such as Bakelite which I have found to be satisfactory for the purpose. The frame may have any suitable dimensions depending on the use to be made of the assembled device. In general the frame is made the approximate thickness as that of the assembled crystal plate or plates and its internal dimensions may fit closely at all points of the crystal edges and cemented thereto securely by any suitable cement such as Duco cement or the frame may have clearances at various points, only being secured by cement at suitable points along the crystal edges which in general will be near the apices of the crystal or crystals.

In Figs. 11 and 12 I show the crystalline element 43 assembled with its electrodes 46 and 47 and their attached leads 48 and 49. This unit may be made in the same manner as I have previously described or in any other suitable manner.

In Fig. 13 I show a modification of my invention in which a plurality of piezo-electric plates and their electrodes may be placed in parallel position; that is, the plates may be arranged with their adjacent major surfaces in contact and securely cemented together as by Duco cement, or they may have separation between them, the electrodes being so poled that the several piezo-electric elements operate in like directions simultaneously or in any other suitable manner. This multiple crystalline unit may be assembled in the frame-like portion as shown in Fig. 10 and Fig. 19 or it may have the bow or toggle elements attached directly to the crystalline surfaces as previously shown and described.

A plan view of another modification of my invention is shown in Fig. 14. This arrangement of crystalline elements provides for a multiplicity of elements arranged in a common plane and having a separator 58 of suitable material such as Bakelite. All of the crystalline elements are so poled that they act as one crystal or they may be connected in any suitable manner. Each crystalline element is cemented in position in a manner analogous to that described in Fig. 10. The hole 59 of the detail of the separator 58 as shown in Fig. 15 serves the same purpose as that provided in the single crystalline element 43 as shown in Fig. 11.

Fig. 16 is a plan view of the multiple crystalline element as shown assembled in Fig. 14 and Fig. 17 is a cross section of the same. The crystalline elements 60, 61, 62 and 63 are provided with electrodes and attached leads; however one large electrode may cover all of the crystalline elements on each side of the assembly.

In Fig. 18 I show in elevation a modification of my invention in which a plurality of layers of crystalline elements 64—65—66—67 are arranged, the top and other layers being arranged in a manner similar to that shown in Fig. 16.

Fig. 19 is an arrangement of my invention in which I have shown a single crystalline element 43 assembled in a frame as in Fig. 10 and upon which bow or toggle elements 68—69 similar to the ones shown in Figs. 4 and 8 are secured to the wings of the frame element 42 by cementing or other means. The pin 70 passes through the hole 44 and is secured to the toggle elements at their central portions. The pin extension provides for attachment to any suitable device to be actuated or to actuate the piezo-electric device. The flexible pads 71 are secured to the wings of the frame member near their extremities to provide support to the assembled unit and to act as dampers of vibrations of the device.

In Fig. 20 I show my piezo-electric unit 76 in conjunction with a lateral cut phonograph record mounted on a suitable base support 77. The lever arm 78 is securely attached to the drive pin at 79 and the lever arm causes the stylus 80 to move when the unit and assembly is used as a cutting or recording mechanism, and to be moved when the unit is used as a phonograph pick-up.

Fig. 21 shows my invention when used in conjunction with the hill and dale type of phonograph record. In this arrangement the stylus is directed parallel with the driving pin of the piezo-electric unit thus responding to the hill and dale impressions of the record groove when used as a pick-up and causing hill and dale impressions on the record when the unit is used as a recorder or cutting device.

Other uses for my invention and its modifications may be readily appreciated by those versed in the art, as for example in association with an oscillograph device either with ink or trace recording or by an oscillating mirror.

In those modifications involving a plurality of pairs of electrodes, either with a single piezo-electric element as in Fig. 6 or with a plurality of elements as in Figs. 13, 14, 16, 17 and 18, the device may be used to set up electrical pulsations in one circuit in response to pulsations in another circuit merely by connecting one circuit to one set of opposed electrodes and the other circuit to another set of opposed electrodes. Thus in Fig. 6 lead 28 would be cut with one end connected in a circuit comprising lead 29 and the other end connected to another circuit comprising lead 30.

When used in conjunction with an acoustical diaphragm for example, the pin 8 of Fig. 5 is caused to move and vibrate, which in turn causes the bow members 6 and 7 to vibrate in a direction parallel to the electrical axis and perpendicular to the major surfaces of the crystalline portion 2. Since the resultant force of the up and down motion of the bows is perpendicular to the major surfaces of the bows and parallel to the plane of the crystalline plate and the ends of the bows are securely attached to the apices of the crystalline plate, the lengthening and shortening action of the bow members is transferred to the crystalline plate in the directions of the long axis of the bow members and from apex to apex of the crystalline portion, this being the mechanical axis of the crystal. The change of length of the chord of the bows is much less than the amplitude of vibration of the bows at the points where the pin 8 is attached and thus a great multiplication of force is obtained, and with a corresponding reduction of amplitude of extension and simultaneous compression of the crystalline portion along the lines $m$—$m$ and $n$—$n$. Since the bows are in opposition on either side of the crystal plate and at right angles to each other, when the upper bow is depressed with a resultant lengthening of the chord of the bow and extension of its attached crystal, along the line $m$—$m$, the lower bow 7 is caused to assume a greater arc with a consequent shortening of its chord and compression of the attached crystal plate along the line $n$—$n$. As the lines $m$—$m$ and $n$—$n$ represent the most active mechanical aspects of the piezo-electric crystalline plate, a maximum of electrostatic force is produced between the electrodes attached to the major surfaces of the crystalline plate. Inasmuch as the bows are securely cemented to each apex of the crystalline plate, any bowing action of the bow elements must cause a bending of the corners of the crystalline plate, producing a cup and crown action to the central portion of the crystalline plate. This convex-concave amplitude is however less than that of the bows since the ends of the crystal bend much easier than does the central portion of the crystal; therefore it is usually necessary to provide the clearance hole 3 of Fig. 3 to permit free motion of the pin 8 of Fig. 4. However in some applications it may be desirable to fix the central portion of the crystal to the pin at their juncture to give an increased stiffness to the assembly.

As well as a waterproof coating of lacquer or other material on the assembly as shown in Fig. 3, it may be desirable to place the whole assembly within a jacket or flexible casing, such as for example a rubber jacket produced by spraying Vultex (a colloidal vulcanized rubber product) over the whole unit assembly, allowing the pin 8 to extend through the flexible casing.

The flexible supporting pads serve to anchor the unit to a suitable supporting member or case. These pads also serve to allow the slight flexion of the bow or toggle members and crystal slab while these are in motion and they also may cause a damping action to the vibrations of the device. In some applications it may be desirable to augment this damping action by a suitable damping pad 22 of Fig. 5 secured to the lower end of the pin 8 or to the lower bow 7. This pad may be made of any suitable flexible substance having a proper resolving action, such as for example the product of a gelatin and glycerine mixture.

The crystalline portion in Fig. 3 has one electrode attached to each major surface. With this arrangement the electrical potential produced by virtue of the piezo-electric action of the crystalline material 2 is relatively low under a given condition of mechanical stress; the capacitive impedance of the arrangement is however relatively low due to the inherent properties of the Rochelle salt crystalline plate and the relatively large electrodes 4 and 5. However when a larger electrical potential is desired from a given mechanical force, that is, a piezo-electric unit having a higher order of sensitivity, the arrangement as shown in Fig. 6 may be preferable.

In this arrangement the electrodes 24, 25, 26 and 27 constitute two separate elements applied to each of the major surfaces of the crystalline plate. These electrodes are connected in series by the lead extensions 28, 29, 30. This arrangement operates very satisfactorily in conjunction with an acoustical diaphragm as a microphone for hearing aids and other devices requiring a high order of sensitivity but not requiring a low impedance source or as faithful reproduction of the low audio frequencies. The electrode arrangements may be further divided, as for example four separate electrodes may be applied to the four quadrants of each major surface of the crystal and connected by suitable lead extensions in series, thus further increasing the electrical potential at the final lead terminals. It is also obvious to those familiar with the art that many combinations of electrodes and lead connections may be made to meet varied requirements. It is also obvious that any of the piezo-electric devices described, having either a single electrode on each surface or a multiplicity of electrodes so attached, can be used in conjunction with an acoustical diaphragm, phonograph pick-up stylus, phonograph recording stylus, or any mechanical device such as for example an acoustical switch, to be operated in conjunction with the piezo-electric device as herein described and shown.

My piezo-electric device can also be mounted on a suitable base and in a suitable case and without mechanical connection to the driving pin 8 of Fig. 4 or the driving pin 32 of Fig. 9; the case and base assembly itself being caused to vibrate, as for example, a vibration pick-up device. In this arrangement a suitable weight may be attached to the driving pin 8 or 32, whereby the mechanical movements of the case and base assembly cause the bow or toggle members to vibrate by virtue of the inertia effect of the small weight and the inertia of the bow or toggle members themselves. Thus in Fig. 7 a weight W is attached to the upper end of the pin 34' and the unit is mounted in a casing 32' of thin Bakelite or the like, the rubber pads corresponding to those of Figs. 4 and 5 being cemented to the casing as well as the unit. Such a device is particularly useful in converting the vibrations of a body into electrical impulses because in use it need only be set on the body, the casing vibrating with the body and the weight W restraining vibration of the bows.

The detail shown in Fig. 8 represents a modification of the bow or toggle members. In this type the flat, slightly flexible material is bent at its center to form a wide obtuse angle, and on its major surface aspect it may be somewhat narrowed at its central portion to permit of easy flexion. Thus in action in association with the crystalline plate, the members assume a toggle action with a consequent augmentation of the forces applied to the toggle-like member in the direction perpendicular to its major surface and in a direction parallel to the long axis of the member and applied to the crystalline plate by virtue of its fixation to the toggle members in the manner above described for the fixation of the other type member.

The mounting arrangement of Fig. 9 provides for an increase in leverage due to the arrangement and location of the supporting pads 38 and 39 because pad 38 acts as a fulcrum and pad 39 acts as a fixed point. When the connecting pin or member 32 is fixed at the opposite end from the supporting pad 39, a larger amplitude of the connecting pin and its associated acoustical diaphragm 31, or other device to be actuated, is obtained. When the pin 32 is vibrated or moved through a certain amplitude, as for example by an acoustical diaphragm or phonograph stylus, the resultant motion of the bows or toggles is reduced, with a proportional increase of force applied to the crystalline plate by the lateral elongation and shortening of the bow or toggle members.

Referring to Figs. 10, 11, 12 and 19, the operation of this modified form of my invention is as follows: The crystalline element 43 and its associated electrodes and leads 48 and 49 is mounted and securely cemented within the space provided by the frame member 42. The slots 42a in the wing portion of the frame member provide for flexibility of the frame member when it is distorted by the action of the crystalline plate 43. Since any lessening of the dimension through $m-m$ will cause the frame to lengthen through the direction $n-n$, I have provided an ideal supporting member for the piezo-electric plate 43, the plate manifesting substantially the same distortion properties when functioning piezo-electrically as has previously been described. The bow or toggle members 68—69 are secured firmly to the portion of the wing members of the frame 42, external to the slotted portion and oriented in a manner similar to that shown in my unit of Fig. 4. The pin 70 passing through the clearance hole 44 is fixed securely to the central portion of the bow or toggle members 68—69, thereby transmitting mechanical impulses to or from the bow members and in turn to or from the wing members of the frame portion, thus actuating the crystal portion within the frame or being actuated by it. The pads 71 provide as previously described and shown in Fig. 5 for a flexible and damping support for the assembly and the pad 75 reacts to dampen vibrations when this element is needed in certain applications, such as for example in association with an acoustical diaphragm when used as a microphone.

I have found that it is desirable to protect the crystalline portion of my unit and its modifications from moisture since the piezo-electric crystalline plate or plates are water soluble and moisture alters the properties. I therefore coat the exposed surfaces of the crystal plate or plates and the electroded portions first with a suitable liquid plastic such as for example cellulose nitrate in a suitable solvent. Then after cementing the various elements such as the bow or toggle members or the crystal portion and its electrodes and leads within the frame member in the modified form of my invention; I apply a final coat of a solution of polystyrene in a suitable solvent. In Fig. 22 such coatings are shown as applied to the plate 2 of Fig. 2. Polystyrene has very low water absorbing properties and a very thin coat provides exceptional moisture-proofing for a device of this type. It is however very difficult to firmly cement to surfaces coated with polystyrene. I therefore apply the cellulose nitrate or similar material to the crystal portion first, cement to this coated surface and then apply the moisture-proofing coat or coats of polystyrene. I consider this process an important part of my invention and believe myself to be the first to use it for moisture-proofing soluble piezo-electric crystalline elements.

I have also found vinylidene chloride to be a suitable substitute for polystyrene in my process.

The crystalline portion shown in side view in Fig. 13, comprises two or more piezo-electric crystalline plates arranged with surfaces adjacent. This arrangement provides for a greater applied force and by virtue of the greater capacity of a plurality of single elements a lower electrical impedance may be obtained or the crystalline portions may have a greater relative thickness and thus maintain a given impedance and gain a greater volume of piezo-electric material and consequent greater applied force and dielectric strength. All crystalline elements may be so poled that the mechanical forces are applied in the same directions simultaneously.

The modification shown in Fig. 14 provides for a plurality of crystalline portions all on the same plane and having a cross-shaped separating member 58 all mounted within the frame-like member 42. The crystal portions may be poled so that all crystals act or react in the same directions as would one large crystal, thus the unit may be assembled with bow or toggle members or by any other means to secure any desirable mechanical movement.

The modification shown in Fig. 18 is like the arrangement shown and described in Figs. 14, 15, 16 and 17 except that this arrangement provides a plurality of layers of crystal elements and demonstrates the same electrical properties as the arrangement shown and described in Fig. 13.

I have found my framed type of element assembly is well suited to the production of a phonograph recorder or pick-up by associating the device with suitable connecting mechanism with a stylus. This is equally true whether the pick-up or recorder is of the lateral-cut type or the so-called hill and dale type. My piezo-electric device and its modifications may be associated equally well with a mirror oscilloscope or a direct recording oscillograph and also equally well with an acoustical switch, and it may be associated with an inertia weight fixed to the device pin or bow or toggle members and thus by vibrating the whole assembly become a vibration pick-up, and many other devices requiring a piezo-electric element in its association.

From the foregoing it will be evident that my invention is to be distinguished from the so-called bimorph device of the prior art in which the stratum on one side contracts in one direction at the same time the stratum on the other side expands in that direction, thereby causing the slab to warp. According to the present invention each stratum expands in the same direction at the same time. Thus when the device comprises superposed layers the corresponding diagonals of the respective layers extend in the same direction so that the expansion at any instant is in the same direction in each layer.

It is to be understood that the particular forms of apparatus shown and described and the particular procedure set forth are presented for purposes of illustration and explanation, and that various modifications of said apparatus and procedure can be made without departing from my invention as defined in the appended claims.

I claim:

1. In a device of the character described the combination of a piezo-electric slab which expands in one direction and contracts in another direction when subjected to electrostatic forces, a toggle extending in one of said directions along one side of the slab, means connecting the ends of the toggle with the slab so that expansion of the slab in the direction of the toggle tends substantially and effectively to straighten the toggle, and an actuator connected to said toggle intermediate its ends.

2. In a device of the character described the combination of a piezo-electric slab which expands in one direction and contracts in another direction when subjected to electrostatic forces, a toggle extending in one of said directions along one side of the slab, means connecting the ends of the toggle with the slab so that expansion of the slab in the direction of the toggle tends substantially and effectively to straighten the toggle, and an actuator connected to said toggle intermediate its ends, said toggle comprising a flexible member which arches away from the slab intermediate its ends.

3. In a device of the character described the combination of a piezo-electric slab which expands in one direction and contracts in another direction when subjected to electrostatic forces, a toggle extending in one of said directions along one side of the slab, another toggle extending in the other of said directions along the opposite side of the slab, means connecting the ends of the toggles with the slab so that expansion of the slab in either of said directions tends to straighten the corresponding toggle, and an actuator interconnecting said toggles intermediate their ends.

4. In a device of the character described the combination of a piezo-electric slab which expands in one direction and contracts in another direction when subjected to electrostatic forces, a toggle extending in one of said directions along one side of the slab, another toggle extending in the other of said directions along the opposite side of the slab, means connecting the ends of the toggles with the slab so that expansion of the slab in either of said directions tends to straighten the corresponding toggle, and an actuator interconnecting said toggles intermediate their ends, each of said toggles comprising a flexible member which arches away from the slab intermediate its ends.

5. In a device of the character described the combination of a piezo-electric slab which expands in one direction and contracts in another direction when subjected to electrostatic forces, a toggle extending in one of said directions along one side of the slab, another toggle extending in the other of said directions along the opposite side of the slab, means fast to the ends of the toggles and bearing on opposite edges of the slab so that expansion of the slab in either of said directions tends to straighten the corresponding toggle, and an actuator interconnecting said toggles intermediate their ends.

6. In a device of the character described the combination of a rectangular piezo-electric slab which expands diagonally when subjected to electrostatic forces, a frame abutting the edge of the slab at each corner, the frame being flexible to accommodate the piezo-electric distortion of the slab, a toggle extending along a diagonal of the slab on one side thereof, the ends of the toggle being connected to said frame, and an actuator connected to the toggle intermediate its ends.

7. In a device of the character described the combination of a rectangular piezo-electric slab which expands diagonally when subjected to electrostatic forces, a frame abutting the edge of the slab at each corner, the frame being flexible to accommodate the piezo-electric distortion of the slab, toggles respectively extending along the two diagonals of the slab an opposite sides thereof, the ends of the toggles being connected to said frame, and an actuator interconnecting the toggles intermediate their ends.

8. In a device of the character described the combination of a rectangular piezo-electric slab which expands diagonally when subjected to electrostatic forces, an integral frame abutting the edge of the slab at each corner, the frame being made of flexible material to accommodate the piezo-electric distortion of the slab, a toggle extending along a diagonal of the slab on one side thereof, the ends of the toggle being connected to said frame, and an actuator connected to the toggle intermediate its ends.

9. In a device of the character described the combination of a flexible rectangular frame, a plurality of rectangular slabs fitted into the frame with their corresponding axes extending approximately parallel to the two diagonals of the frame respectively so that the frame is flexed by the slabs conjointly when the slabs are subjected to piezo-electric distortions, a toggle extending along a diagonal of the slab on one side thereof, the ends of the toggle being connected to the corners of the frame, and an actuator connected to the toggle intermediate its ends.

10. In a device of the character described the combination of a flexible rectangular frame, a plurality of rectangular slabs fitted into the frame with their corresponding axes extending approximately parallel to the two diagonals of the frame respectively so that the frame is flexed by the slabs conjointly when the slabs are subjected to piezo-electric distortions, said slabs lying in the same plane, spacers between the opposing edges of the slabs, a toggle extending along a diagonal of the slab on one side thereof, the ends of the toggle being connected to the corners of the frame, and an actuator connected to the toggle intermediate its ends.

11. A piezo-electric device according to claim 1 further characterized by elastic base members for supporting the device at its four corners.

12. A piezo-electric device according to claim 1 further characterized by elastic base members for supporting the device, one at the extremity of said toggle and another intermediate the ends of the toggle, the aforesaid actuator being fixed to the device near the other end of said toggle.

13. A piezo-electric device according to claim 1 further characterized by an inertia weight fixed to the actuator to cause the device to vibrate bodily.

14. In a device of the character described the combination of a piezo-electric slab which expands in one direction and contracts in another direction when subjected to electrostatic forces, the expansion at any instant being in the same direction in each stratum throughout the thicknesses of the slab, a toggle extending in one of said directions along one side of the slab, means connecting the ends of the toggle with the slab so that expansion of the slab in the direction of the toggle tends to straighten the toggle, and an actuator connected to said toggle intermediate its ends.

15. A piezo-electric device comprising a slab which expands in one flatwise direction when subjected to electrostatic forces, a flexible member extending along one side of the device, and means interconnecting the slab and member at the periphery of the slab, the member being arched in said direction so that it tends to straighten when the slab expands as aforesaid.

16. A piezo-electric device comprising a slab which expands in one flatwise direction when subjected to electrostatic forces and a flexible member extending along one side of the device, the member being cemented to the slab at the periphery of the slab and being arched in said direction so that it tends to straighten when the slab expands as aforesaid.

17. A piezo-electric device comprising a slab which expands in one flatwise direction and contracts in another edgewise direction when subjected to electrostatic forces, a flexible member extending along each side of the device, and means interconnecting the slab and members at the periphery of the slab, each member being arched in one of said directions so that it tends to straighten when the slab expands in that direction.

18. A piezo-electric device comprising a slab which expands in one flatwise direction and contracts in another edgewise direction when subjected to electrostatic forces, a flexible member extending along one side of the device, a flexible member extending along the other side of the device, and means interconnecting the slab and members at the periphery of the slab, the members being arched in said directions respectively so that each member tends to straighten when the slab expands in the direction in which it is arched.

RAYMOND W. TIBBETTS.